Patented Nov. 19, 1946

2,411,219

UNITED STATES PATENT OFFICE 2,411,219

REACTION PRODUCTS OF DIHALOETHERS WITH DITHIOCARBAMATES

Roger A. Mathes, Akron, Ohio, assignor to The B. F. Goodrich Company, New York, N. Y., a corporation of New York No Drawing. Application December 2, 1944, Serial No. 566,397

7 Claims. (Cl. 260—455)

This invention relates to the products of the reaction between dihaloethers and dithiocarbamates and a process for preparing same.

My new compounds are particularly useful as accelerators for the vulcanization of rubber, although they may also be used as insecticides, fungicides, etc. Among the rubbers with which my new accelerators may be used are all varieties of natural rubber, such as caoutchouc, balata, gutta percha, latex, reclaimed rubber, artificial rubber isomers and such synthetic rubbers as can be vulcanized with sulfur, such as polymers of butadiene, isoprene, 2,3-dimethyl butadiene, piperylene, and the like and copolymers of such compounds with acrylonitrile, styrene, methyl acrylate, methyl methacrylate, isobutylene, and other copolymerizable monomers. These new accelerators may be added to the rubber on a roll mill or in an internal mixer or by any other suitable method. Other compounding ingredients, such as any of the ordinary pigments, fillers, dyes, antioxidants, or other accelerators of vulcanization may be employed together with my new materials.

These reaction products can be prepared by reacting an ammonium or alkali metal dithiocarbamate with a dihaloether of the following general formula:

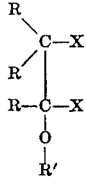

where R is a substance selected from the group consisting of alkyl groups and hydrogen; R' is a substance selected from the group consisting of alkyl hydrocarbons, aryl hydrocarbons, substituted aryl, and substituted alkyl groups; and X is a halogen.

Dihaloethers that are examples of the above general formula are alpha-beta-dichlorodiethylether; phenyl 1,2-dichloroethylether; and ethyl-1,2-dibromoisobutylether.

The dithiocarbamates that are equivalents in this reaction are of the following general formula:

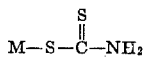

where M is a substance selected from the group consisting of ammonium and alkali metals.

The mechanism of the reaction and the structure of the products is not fully understood; however, it appears possible that the ammonium or alkali metal dithiocarbamates and dihaloethers react in molecular proportions as indicated in the following general reaction formula:

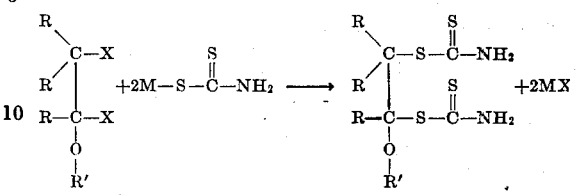

where R, R', M and X retain their identity as given above.

The following example is to be regarded as a specific embodiment of the invention and not as a limitation thereof.

0.4 molecular equivalent of ammonium dithiocarbamate is dissolved in a quantity of water sufficient to make a 30% solution by weight. To this solution substantially 0.2 molecular equivalent of alpha-beta-dichloroethylether is added slowly with stirring over a period of about 40 minutes. During this addition, the temperature of the reaction mixture rises spontaneously to 40° C. Stirring of the reaction mixture is continued for a period of about 2 hours. During this period, a viscous brown yellow oil is formed which is the reaction product. Stirring is discontinued and the reaction mixture is allowed to stand to allow the oily reaction product to form a separate layer. The crude reaction product is then separated and recovered by decantation. The oil is then purified by extraction with isopropyl acetate and dried with calcium chloride. The dry weight of the reaction product purified in this manner is 23.4 gms. which represents a yield of 46%. The reaction product formed possibly possesses the following formula:

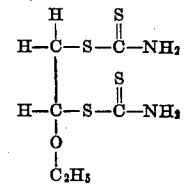

The order of addition of the reactants may be changed by adding a solution containing dithiocarbamate to a solution containing a dihaloether, or the reaction may be carried out under anhydrous conditions by employing an organic solvent such as ether or benzene.

As an indication of the accelerating power of these compounds, I shall describe the effect produced in rubber by the product of the above example. The following rubber composition, in which the parts are by weight, was prepared:

| | Parts |
|---|---|
| Rubber | 100 |
| Zinc oxide | 5 |
| Sulfur | 3 |
| Stearic acid | 1 |
| Product of above example | 1 |

After vulcanization at 287° F., the composition had the physical properties shown in the following table, in which T is the ultimate tensile strength in lb./sq. in. and E is the ultimate elongation in percent.

| Time of vulcanization in minutes | T | E |
|---|---|---|
| 15 | 2,510 | 880 |
| 30 | 3,080 | 855 |
| 60 | 2,960 | 825 |
| 90 | 3,020 | 815 |
| 120 | 2,810 | 800 |

Without an accelerator present the same physical properties may be obtained in 2 to 3 hours at the same vulcanization temperature. But equally good results as indicated above may be obtained using other products disclosed by this invention.

These new products are quite stable and are capable of being stored for long periods of time at room temperature without deterioration.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. A process for the preparation of the reaction products of alpha-beta-dihaloethers with dithiocarbamates which comprises reacting an alpha-beta-dihaloether with a member selected from the group consisting of ammonium and alkali metal salts of dithiocarbamic acid.

2. A process for the preparation of the reaction products of alpha-beta-dihaloethers and dithiocarbamates which comprises reacting an alpha-beta-dihaloether with ammonium dithiocarbamate.

3. A process for the preparation of the reaction product of alpha-beta-dichlorodiethylether and ammonium dithiocarbamate which comprises reacting alpha-beta-dichlorodiethylether and ammonium dithiocarbamate.

4. A process for the preparation of the reaction product of alpha-beta-dichlorodiethylether and ammonium dithiocarbamate which comprises reacting alpha-beta-dichlorodiethylether with an aqueous solution of ammonium dithiocarbamate and recovering the oily reaction product from reaction medium by decantation.

5. The organic products of the reaction between an alpha-beta dihaloether and a member selected from the group consisting of ammonium and alkali metal salts of dithiocarbamic acid.

6. The organic products of the reaction between an alpha-beta-dihaloether and ammonium dithiocarbamate.

7. The organic product of the reaction between alpha-beta-dichlorodiethylether and ammonium dithiocarbamate.

ROGER A. MATHES.